(12) United States Patent
Zeng

(10) Patent No.: US 8,232,872 B2
(45) Date of Patent: Jul. 31, 2012

(54) CROSS TRAFFIC COLLISION ALERT SYSTEM

(75) Inventor: Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 434 days.

(21) Appl. No.: 12/629,962

(22) Filed: Dec. 3, 2009

(65) Prior Publication Data

US 2011/0133917 A1 Jun. 9, 2011

(51) Int. Cl.
*B60Q 1/00* (2006.01)

(52) U.S. Cl. ............ 340/436; 340/425.5; 340/435; 340/426.24

(58) Field of Classification Search ........... 340/425.5, 340/436, 435, 426.24
See application file for complete search history.

(56) References Cited

U.S. PATENT DOCUMENTS

| | | | |
|---|---|---|---|
| 5,712,640 A * | 1/1998 | Andou et al. | 342/70 |
| 5,767,793 A * | 6/1998 | Agravante et al. | 340/903 |
| 5,979,586 A * | 11/1999 | Farmer et al. | 180/274 |
| 6,871,145 B2 * | 3/2005 | Altan et al. | 701/301 |
| 7,124,027 B1 | 10/2006 | Ernst | |
| 7,385,486 B2 * | 6/2008 | Danz et al. | 340/435 |
| 2002/0016663 A1 | 2/2002 | Nakamura | |
| 2005/0010342 A1 | 1/2005 | Li | |
| 2008/0243332 A1 * | 10/2008 | Basir et al. | 701/35 |
| 2008/0306666 A1 * | 12/2008 | Zeng et al. | 701/70 |

* cited by examiner

*Primary Examiner* — Travis Hunnings

(57) ABSTRACT

A cross traffic collision alert system is provided that includes an image-based detection device for capturing motion data of objects in a region of a direction of travel. A motion analysis module monitors the captured motion data. A salient region detection module identifies regions of interest within the captured motion data. A predictive object detection module is responsive to the outputs of the motion analysis module and the salient region detection module for generating at least one object candidate. Non-imaging object detection sensors sense a region for detecting the at least one object candidate. An object tracking module tracks the at least one object candidate and fuses the at least one object candidate transitioning between the regions. A threat assessment module determines a threat assessment of a potential collision between a tracked object candidate and the driven vehicle and determines whether a warning should be provided.

23 Claims, 7 Drawing Sheets

CROSS TRAFFIC COLLISION ALERT SYSTEM

BACKGROUND OF INVENTION

An embodiment relates generally to determining a collision threat for cross traffic collisions.

Various types of safety systems are known in the art for protecting the occupants of a vehicle in the event of a collision. Some of these systems attempt to prevent the collision before it occurs by warning the vehicle operator of a potential collision situation. For example, a forward collision warning system (FCW) may employ a forward-looking laser or radar device that alerts the vehicle driver of a potential collision threat. The alerts can be a visual indication on the vehicle's instrument panel or a head-up display (HUD), and/or can be an audio warning or a vibration device, such as a HAPTIC seat. Other systems attempt to prevent a collision by directly applying a braking action if the driver fails to respond to an alert in a timely manner.

SUMMARY OF INVENTION

An advantage of an embodiment is detection of crossing traffic by a tracking and fusing of data captured by short range radar sensors and vision based devices. Once the objects are detected, the position and velocity of the objects are tracked to determine potential interaction with the driven vehicle.

An embodiment contemplates a cross traffic collision alert system for a driven vehicle. A cross traffic collision alert system includes an image-based detection device for capturing motion data of objects in a region of a direction of travel of a driven vehicle. A motion analysis module monitors the captured motion data. The motion analysis module identifies potential moving objects in the captured motion data. A salient region detection module identifies regions of interest within the captured motion data that indicates at least portions of potential moving objects. The salient region module detects regions having varying characteristics within the captured motion data. A predictive object detection module responsive to the outputs of the motion analysis module and the salient region detection module generates at least one object candidate based on the potential moving objects identified by the motion analysis module and the salient region detection module. Non-imaging object detection sensors detect the at least one object candidate in a region sensed by the non-imaging object detection sensors. An object tracking module for tracks the at least one object candidate detected by the predictive object detection module and by the non-imaging object detection sensors. The object tracking module fuses the at least one object candidate transitioning between the region sensed by the non-imaging object detection sensors and the region captured by the image-based sensing device. The object tracking module tracks a position and velocity of the at least one object candidate in relation to the driven vehicle. The at least one object candidate transitioning between the regions is fused which includes merging object data representing the at least one object candidate in the motion data with sets of particles representing potential objects in the region sensed by the non-imaging object detection sensors. A threat assessment module for determines a threat assessment of a potential collision between a tracked object candidate and the driven vehicle. The threat assessment module determines whether a warning should be provided in response to the threat assessment.

A method for detecting a potential collision between a driven vehicle and an object crossing a path of the driven vehicle. A potential moving object is detected using non-imaging object detection sensors in a region sensed by the non-imaging object detection sensors. Motion data of objects in a region of a direction of travel of the driven vehicle is captured by an image-based detection device. Potential moving objects from the captured motion data in the region captured by the image-based detection device is detected. Regions of interest are identified within the captured image data that include potential moving objects. A predictive object detection analysis is applied that is responsive to the identified potential moving object and the identified regions of interest within the captured motion data for tracking at the identified potential moving object potentially on a collision path with the driven vehicle. The potential moving objects transitioning between a region sensed by the non-imaging object detection sensors and the region captured by the image-based sensing device are fused. The object tracking module tracks a position and velocity of the potential moving objects in relation to the driven vehicle. A threat assessment of a potential collision is determined between a tracked object and the driven vehicle. A warning of a potential collision is issued between an object and the driven vehicle in response to the threat assessment.

DETAILED DESCRIPTION

Figure 1:
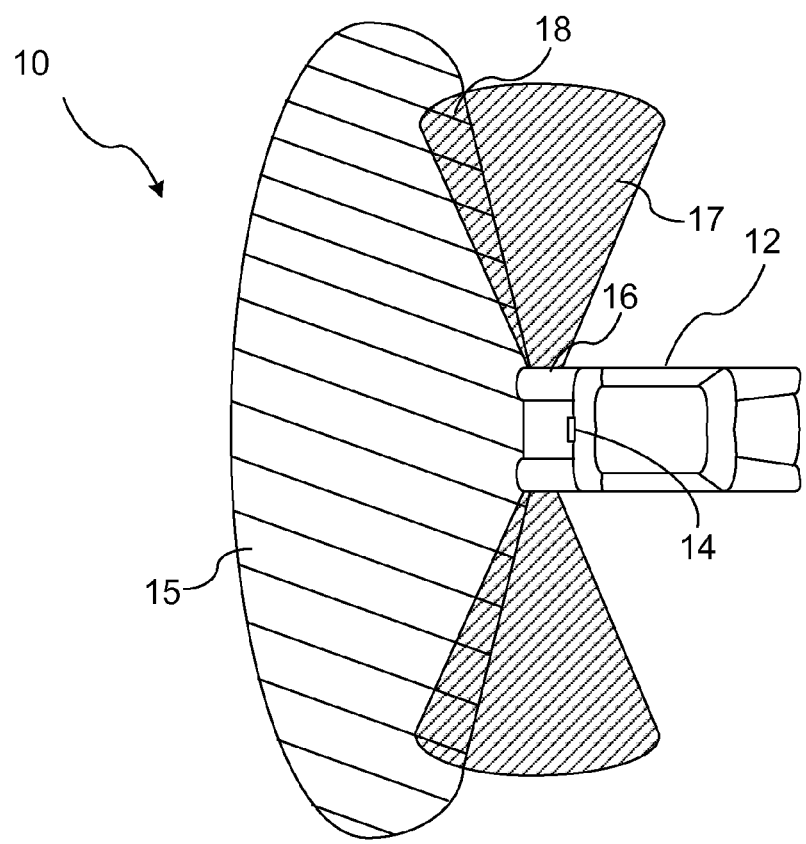
FIG. 1 is an illustration of a vehicle equipped with cross traffic detection system.
Figure 2:
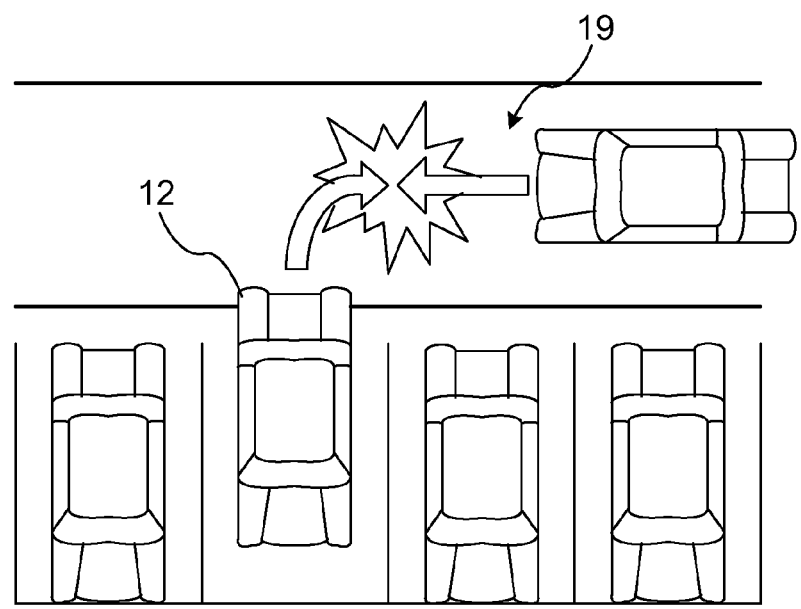
FIG. 2 is a plan view of a vehicle in a vehicle coordination system.

There is shown in FIG. 1, generally at 10, an illustration of a vehicle 12 equipped with a cross traffic object detection system for monitoring a sensed region for potential collisions with crossing traffic. The vehicle 12 as shown is for exemplary purposes and it should be understood that the vehicle may include any type of vehicle such as a car, truck, suv, or motorcycle. The vehicle is equipped with a video imaging device 14 for capturing images in a region 15 and non-imaging object detection sensors 16 (e.g., short range radar sensors) mounted on each side of the vehicle for detecting objects in a region 17 (i.e., on both sides of the vehicle). The video imaging device 14, shown in FIG. 1, is mounted facing the rear of the vehicle 12 for capturing images from a rear-viewing position. The non-imaging object detection sensors 16 are mounted on rearward sides of the vehicle for cooperatively detecting objects with the video imaging device 14 along a cross travel path of the rear moving vehicle 12. As a result, the respective regions of detection by both video imaging device 14 and the non-imaging object detection sensors 16 include non-overlapping regions. Overlapping regions, such as those shown at 18, may be formed by an overlap of region 15 and region 17. The rear cross traffic object detection system avoids a potential collision between the vehicle 12 backing out of a parking space and a vehicle 19 crossing the path of the vehicle 12 as illustrated in FIG. 2. It should be understood that although the embodiment described herein relates to a rearward driven vehicle, the system may be utilized for a forward driven vehicle where the sensors and video imaging device may be mounted elsewhere for detecting front crossing traffic.

Figure 3:
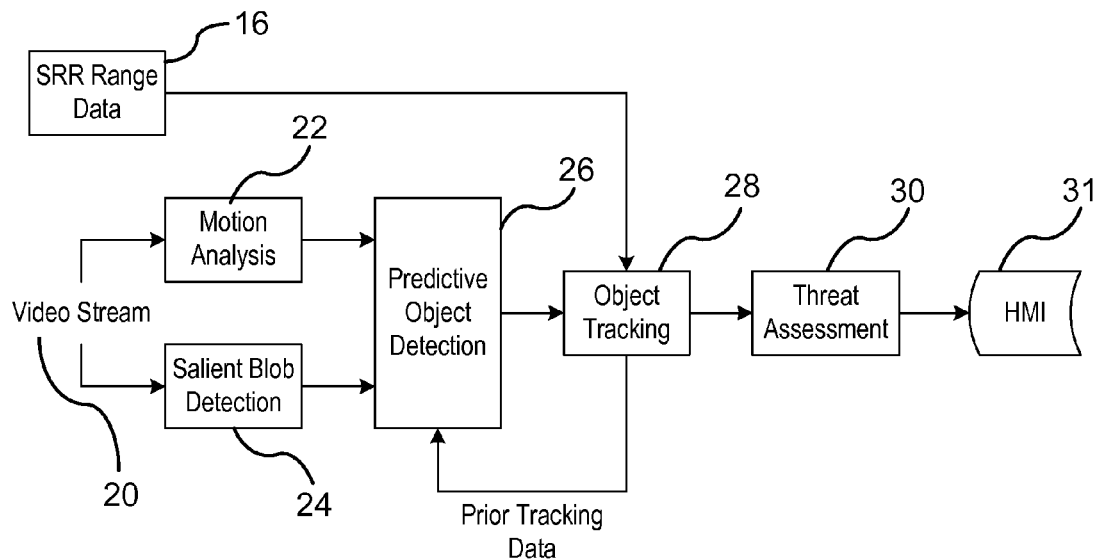
FIG. 3 is a block diagram of a cross traffic detection process.

FIG. 3 illustrates a block diagram of the cross traffic object detection process. A summary of the system is described herein. A video stream 20 that is captured by the video imaging device is applied to a motion analysis module 22 and a salient region detection module 24.

The motion analysis module 22 monitors the captured input video stream and highlights motion blobs in the image. The term blob as used herein represents something that exists in the image but is not well-defined at the moment to determine whether the image is a vehicle, a moving object, a stationary object, or some other entity.

The salient region detection module 24 monitors each frame of the captured video input stream and provides regions of interest which could indicate the presence of objects or parts of objects in a respective image plane. The outputs from the motion analysis module 22 and the salient region detection module 24 are provided to a predictive object detection module 26.

The predictive object detection module 26 monitors the outputs of the motion analysis module 22 and the salient region detection module 24 for generating a plurality of image candidates for each highlighted object. The output of the predictive object detection module 26 is analyzed by an object tracking module 28. Outputs from the non-imaging object detection sensors 16 are provided to the object tracking module 28.

The object tracking module 28 fuses the objects based on the data supplied from the predictive object detection module 26 and the non-imaging object detection sensors 16 and identifies respective attributes such as a respective object's position and velocity. The fused data from the object tracking module 28 is provided to a threat assessment module 30 which determines the threat of a crossing object and also determines whether to actuate a warning message via a HMI 31 or similar to the driver of the vehicle.

Figure 4:
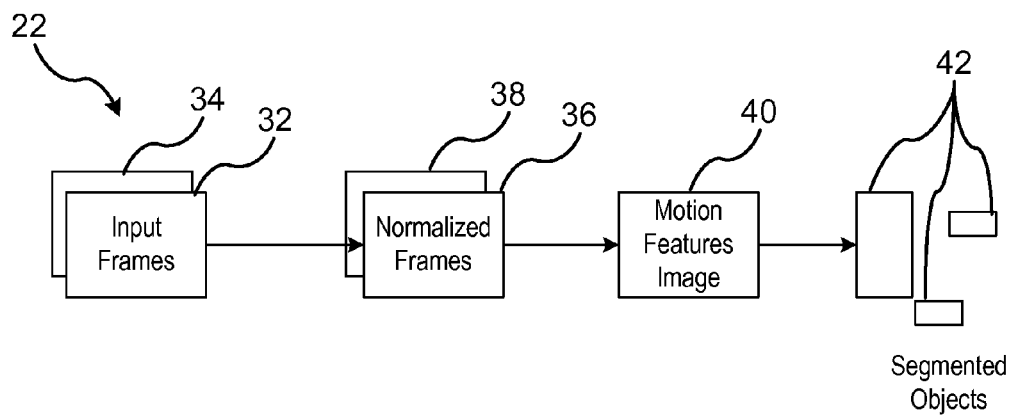
FIG. 4 is a flow process for motion analysis.

FIG. 4 illustrates a block diagram of the motion analysis module 22. The motion analysis module 22 segments motion features from the image as a whole. The motion features are derived from two consecutive input frames 32 and 34. The input frames 32 and 34 are normalized in respective frames 36 and 38. An optical flow operator is applied to the normalized frames 36 and 38 for producing a motion feature image 40. Segmented objects 42 are derived from the motion feature image 40. Segmented objects 42 are determined by finding a local maximum blob in the motion feature image 40.

For a respective image for which the image frame is applied, let $I_t(x, y)$ be the image frame at time instant t, where x and y represent the rows and columns, respectively, of pixels. The normalized frames 36 and 38 are represented by the formula as follows:

$$N(x, y) = \frac{I(x, y) - \mu\{I(x, y)\}}{\sigma\{I(x, y)\}} \sigma' + \mu'$$

where the operators $\mu\{\ \}$ represents the mean and $\sigma\{\ \}$ represents the standard deviation of an intensity of the pixels in image frame I (x, y), and $\mu$ and $\sigma$ are predetermined parameters.

An optical flow operator, such as Lucas-Kanada, is applied to two consecutive image frames $I_{t-1}(x, y)$ and $I_t(x, y)$. Time instant t represents a current time frame for the captured image whereas time instant t−1 represents a previous time frame of the captured image. As result, a moving object may be detected based on the movement of the object between the current time frame t and the previous time frame t−1 known as an optical flow image. A threshold and connected component tracking is applied on the optical flow image for identifying regions of candidates in the raw image where significant motion is detected.

The salient region module 24 as described in FIG. 1 detects regions in the image that have significant varying characteristics (e.g., brighter or darker characteristics) in comparison to other objects in the image, or have more edges and corners than the surrounding objects in the image. These respective regions typically enclose objects or parts of objects, and therefore, it is advantageous to identify such respective regions for further evaluation.

Figure 5:
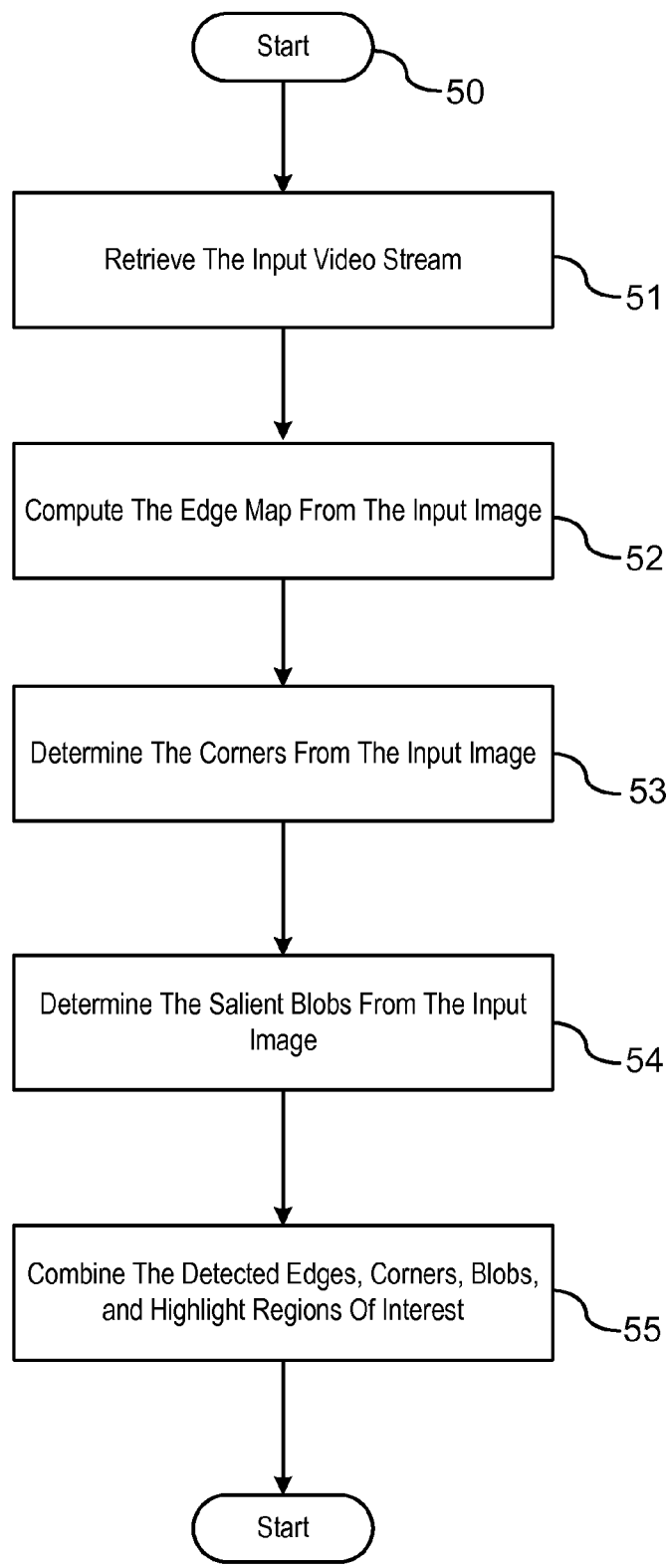
FIG. 5 is a flow diagram for identifying salient regions of interest.

FIG. 5 illustrates the process for identifying salient regions of interest. In step 50, the routine for identifying the salient regions of interest is initiated. In step 51, the input video stream is captured and analyzed.

Figure 6:
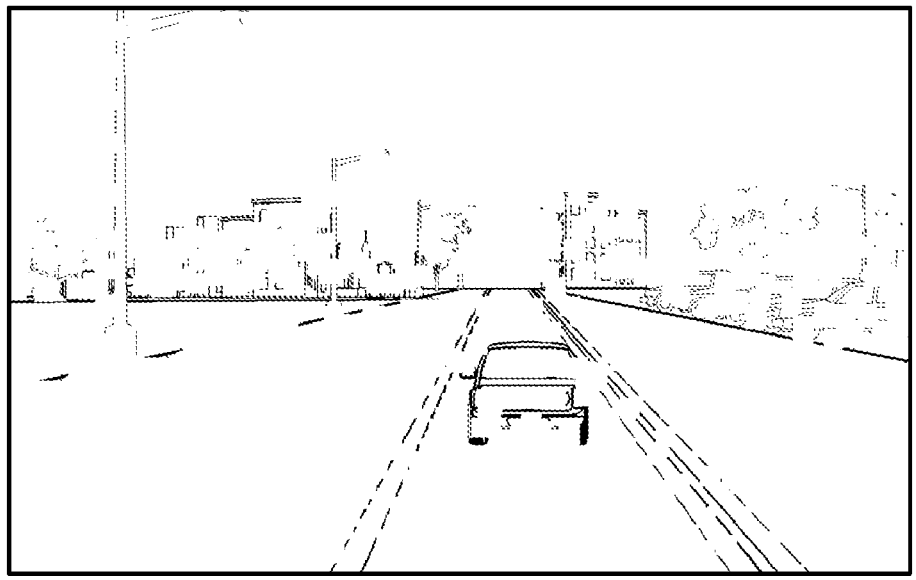
FIG. 6 is an exemplary illustration of an edge detection map.

In step 52, edges are determined from the input video stream. An edge map identifying the edges is shown in FIG. 6.

Figure 7:
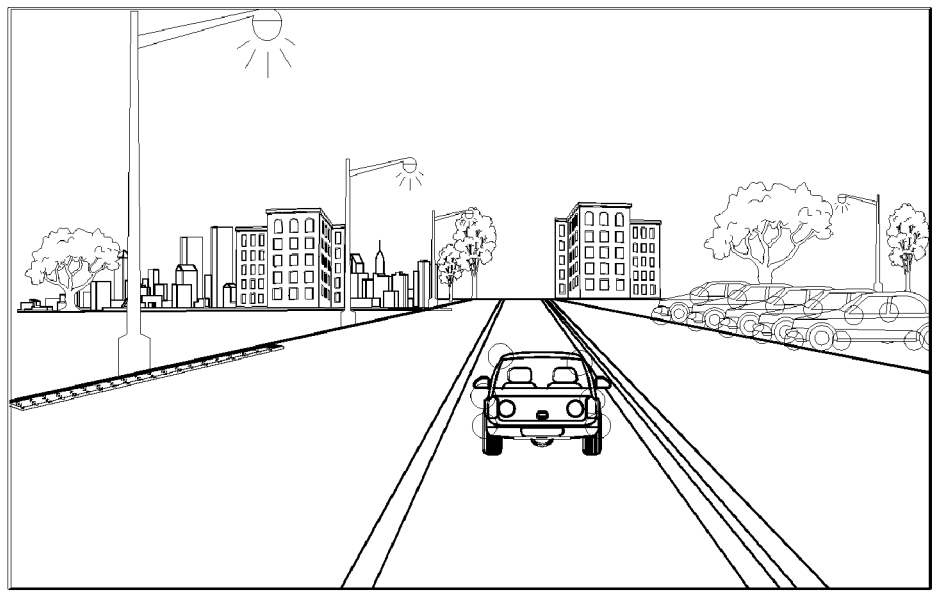
FIG. 7 is an exemplary illustration of a corner detection map.

In step 53, corners are determined from the input video stream. A corner map identifying corners is shown in FIG. 7.

Figure 8:
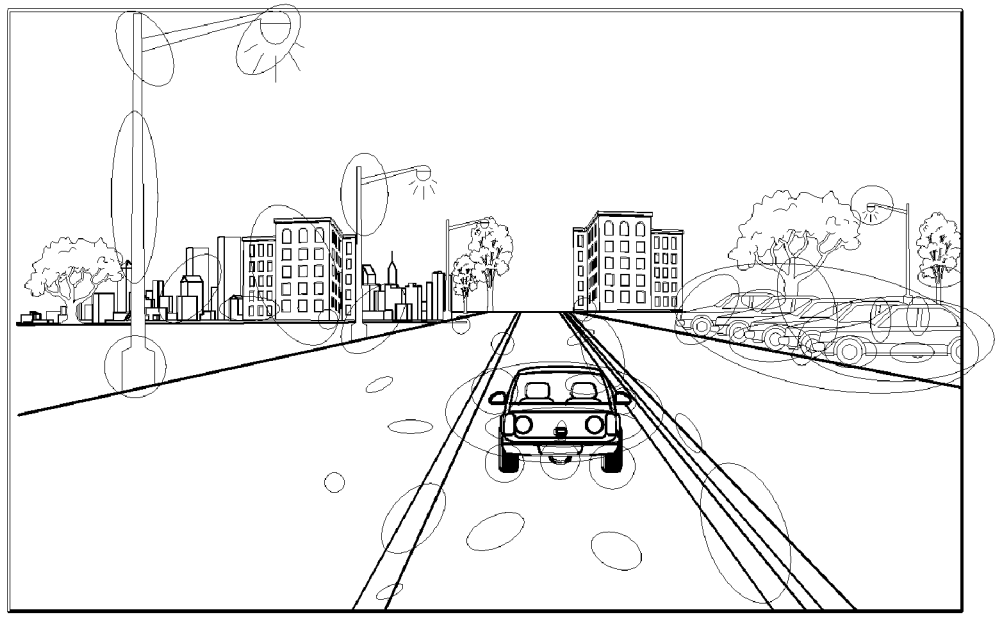
FIG. 8 is an exemplary illustration of blob detection map.

In step 54, salient blobs are determined from the input video stream. A salient blob map identifying blobs is shown in FIG. 8.

Figure 9:
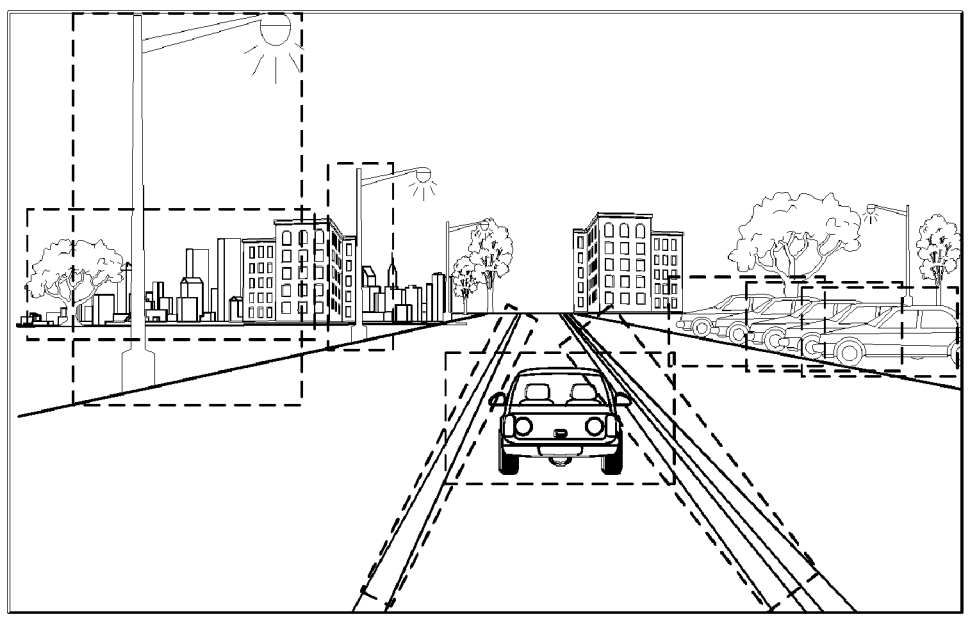
FIG. 9 is an exemplary illustration of a salient region of interest detection map.

In step 55, the detected edges, corners, and salient blobs are combined for identifying salient regions of interest. A salient region of interest map is identifying regions of interest is shown in FIG. 9.

In reference to the salient blob detection process of step 54, a Gaussian operator is applied on the image. For the input image I(x, y), the image is convolved by a Gaussian kernel represented by the following formula:

$$g(x, y, t) = \frac{1}{2\pi t} e^{-\frac{(x^2+y^2)}{2t}}$$

which is given at a certain scale t to provide a scale-space representation. This is represented by the following formula:

$$L(x,y,t) = g(x,y,t) * f(x,y).$$

A scale-normalized Difference of Gaussian (DoG) operator is computed. The DoG operator is represented by the following formula:

$$DoG\{I(x, y); t\} = \frac{1}{2\Delta t}(L(x, y; t + \Delta t) - L(x, y; t - \Delta t).$$

To find the salient blobs, points are identified that are simultaneously local maxima/minima of the DoG operation with respect to both space and scale. This may be represented by the following formula:

$$(\hat{x},\hat{y},\hat{t}) = \arg\max \min_{(x,y,t)} (DoG\{I(x,y),t\})$$

Figure 10:
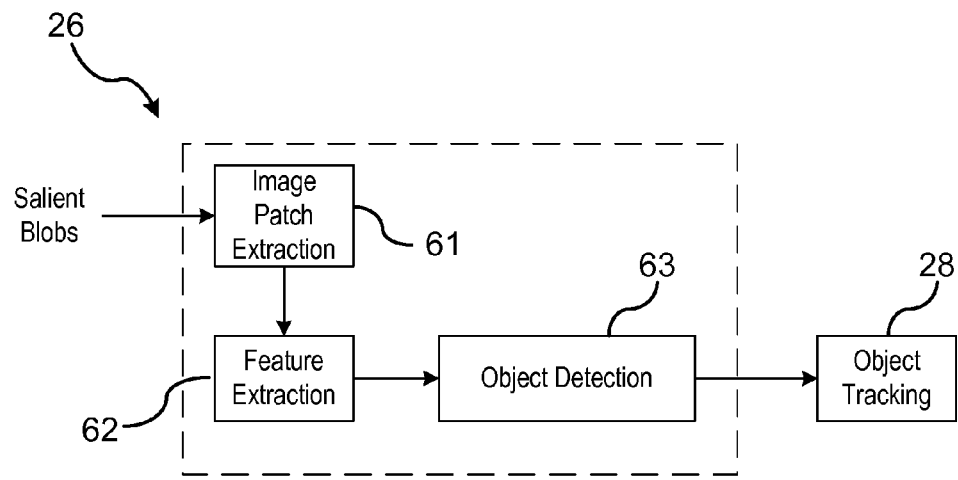
FIG. 10 is a block diagram of a predictive object detection module.

FIG. 10 illustrates a block diagram of the predictive object detection module 26. The predictive object detection module 26 monitors outputs from the motion analysis module and the salient blob detection module. The predictive object detection module 26 also receives outputs at a previous time instant from the object tracking module. The salient regions of interest provided to the predictive object detection module 26 can be represented as positions and sizes in the image frame. An image patch extraction module 61 extracts a sub-image $S_k$ that may enclose an object by indicating the location and size of input image patches or an object's previous position and size. A feature extraction module 62 computes a distribution of edge, corner, or appearance of the selected sub-image patch $S_k$. The computed distribution is mapped to a feature descriptor vector $f_k$. The object detector module 63 then classifies whether the feature descriptor vector represents an object. A vector $p_k=(u,v)$ represents a location of a bottom portion of the sub-image $S_k$ where u is the row and v is the column indices of the location.

Numerous featured descriptors are used in the feature extraction including, but not limited to, Scale-invariant feature transform (SIFT), Speeded Up Robust Features (SURF), Maximally Stable Extreme Regions (MSER), Histogram of Oriented Gradients (HOG), and eigen-image coefficients. A core part of the object detector module includes a statistical classifier, which is trained using significant number of object and non-object image samples. Such classifiers may include, but is not limited to, Support Vector Machine (SVM) and Neural Network (NN).

The object tracking module 28 monitors outputs of the predictive detection module 26 and short range radar (SRR) sensing devices and fuses object information obtained by these respective sensors. The object tracking module 28 generates fused object data such as position and velocity in a host vehicle coordinate frame. Particle filtering may be used by the object tracking module.

The SRR range data obtained by the SSR sensing devices may be represented by:

$$\{q_k=(r_n,\dot{r}_n,\theta_n)|n=1,\ldots,M\}$$

where r represents the range, $\dot{r}$ represents the range rate, and $\theta$ represents the azimuth angle of the n-th radar object.

Assuming that the object detector module provides N object candidates represented by locations in the image plane $\{p_1k|k=1,\ldots,N\}$, then the k-th object can be written in the homogeneous representation as follows:

$$\{q_k=(u_k,v_k,1)^\tau|k=1,\ldots,N\}$$

If it is assumed that the ground surface can be approximated by a flat plane, then there exists a homographic transform H between the ground plane and the image plane of the camera, such that:

$$q=HX$$

where q represents the homogeneous representation of the image location, and the following formula represents the homogeneous representation of the object position in the ground plane:

$$X=(x',y',1)^\tau$$

H can be determined by the intrinsic parameters (i.e., focus, optical center, and distortion) and the extrinsic parameters (e.g., the video capture device location and orientation in the host vehicle frame) of the video capture device which can be obtained by video capture device calibration process.

It is further assumed that the k-th object location $p_k$ corresponds to the object's projection on the ground plane. Therefore, the target positions in the vehicle frame can be written as homogeneous coordinates $\{X_k=H^{-1}q_k|k=1,\ldots,N\}$. Therefore, the k-th object $X_k=(x'_{ok},y'_{ok},c_k)$, the x-y coordinate in the vehicle frame can be written as:

$$x_{ok} = \frac{x'_{ok}}{c_k},$$

$$y_{ok} = \frac{y'_{ok}}{c_k}.$$

Figure 11:
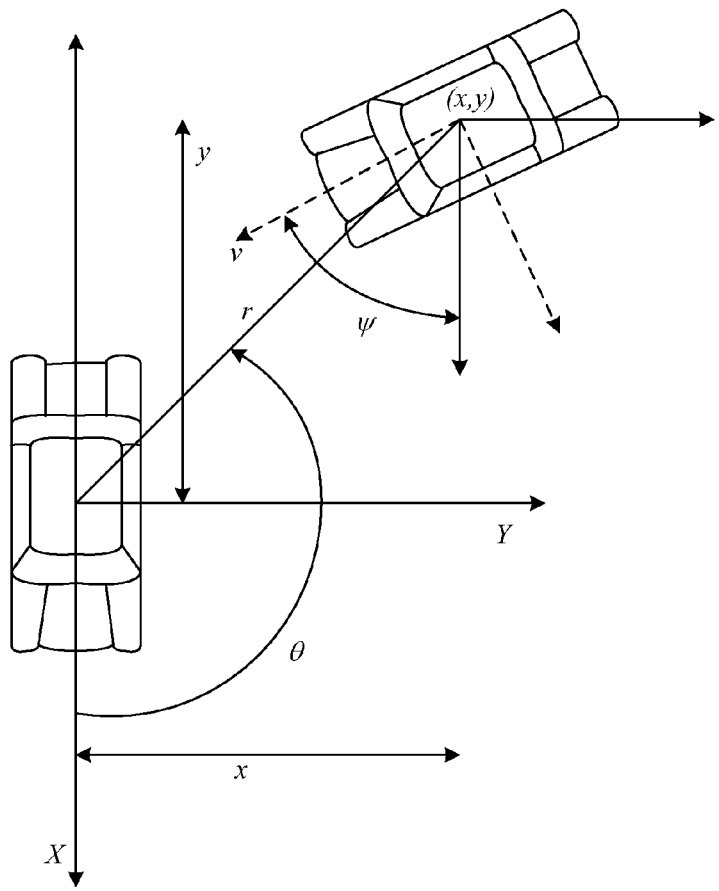
FIG. 11 is a vehicle dynamic model of two interacting vehicles.

FIG. 11 illustrates plant model of a dynamic motion between the rearward driven vehicle and the target vehicle for determining a projected path of the rearward driven vehicle. The attributes of the vehicle for the object tracking module includes $x=(x,y,\phi,\omega,v)$ where x,y represent the x-y position, $\phi$ represents the pose, $\omega$ represents the angular velocity (e.g., change rate of pose), and $v$ represents the velocity of the object, respectively.

Dynamic evolutions of the object can be represented as follows:

$$x'=x+(v\cos\theta+y\omega_H-v_{xH})\Delta T+\Delta T\cos\phi o_2;$$

$$y'=y+(v\cos\theta+x\omega_H-v_{xH})\Delta T+\Delta T\sin\phi o_2;$$

$$\phi'=\phi+(\omega-\omega_H)\Delta T+\Delta T o_1;$$

$$\omega'=\omega+o_1, \text{ and};$$

$$v'=\omega+o_2$$

where $x'=(x',y',\phi',\omega',v')$ represents the object state at the next time instant; $v_{xH}$ and $v_{yH}$ are the longitudinal speed and lateral speed of the host vehicle, respectively, and $\omega_H$ represents the yaw-rate of the host vehicle.

The measurements, in the vehicle frame, of the object may include a video estimate $(x_{1ok}, y_{1ok})$, a radar estimate $(r_n,\dot{r}_n,\theta_n)$, or both. As a result, the measurement equations can be written as follows:

$$x_{ok} = x + v_1;$$

$$y_{ok} = y + v_2;$$

$$r_k = \sqrt{x^2+y^2} + v_3;$$

$$\dot{r}_k = \frac{xv\cos\phi + yv\sin\phi}{r_k} + v_4;$$

$$\theta_k = \tan^{-1}\left(\frac{y}{x}\right) + v_5$$

where v represents a measurement zero-mean white Gaussian noise for each question.

The threat assessment module assesses all of the tracked objects and determines whether an object is an immediate threat or not. The output of the object tracking module can be viewed as sets of particles with each set of particles representing possible state vectors of a tracked object. For a k-th object, the following particle set is represented by the following equation:

$$s=\{x_k^{(i)}|i=1,\ldots,K\}$$

where K represents a maximum number of particles for each object.

A target selection method similar to that described in co-pending application having Ser. No. 11/758,187 filed Jun. 5, 2007, herein incorporated by reference, may be used to determine whether the particle is in a projected path of the host vehicle. In addition, the threat assessment warning may be used by determining the flags in the target selection method. The percentage of the flags is set to active warning for all particles in set (s) of the k-th object. If the percentage is larger than a threshold (e.g., 90%), then the objects poses an immediate threat to the host vehicle and appropriate collision counter-measurement shall be triggered.

Figure 12:
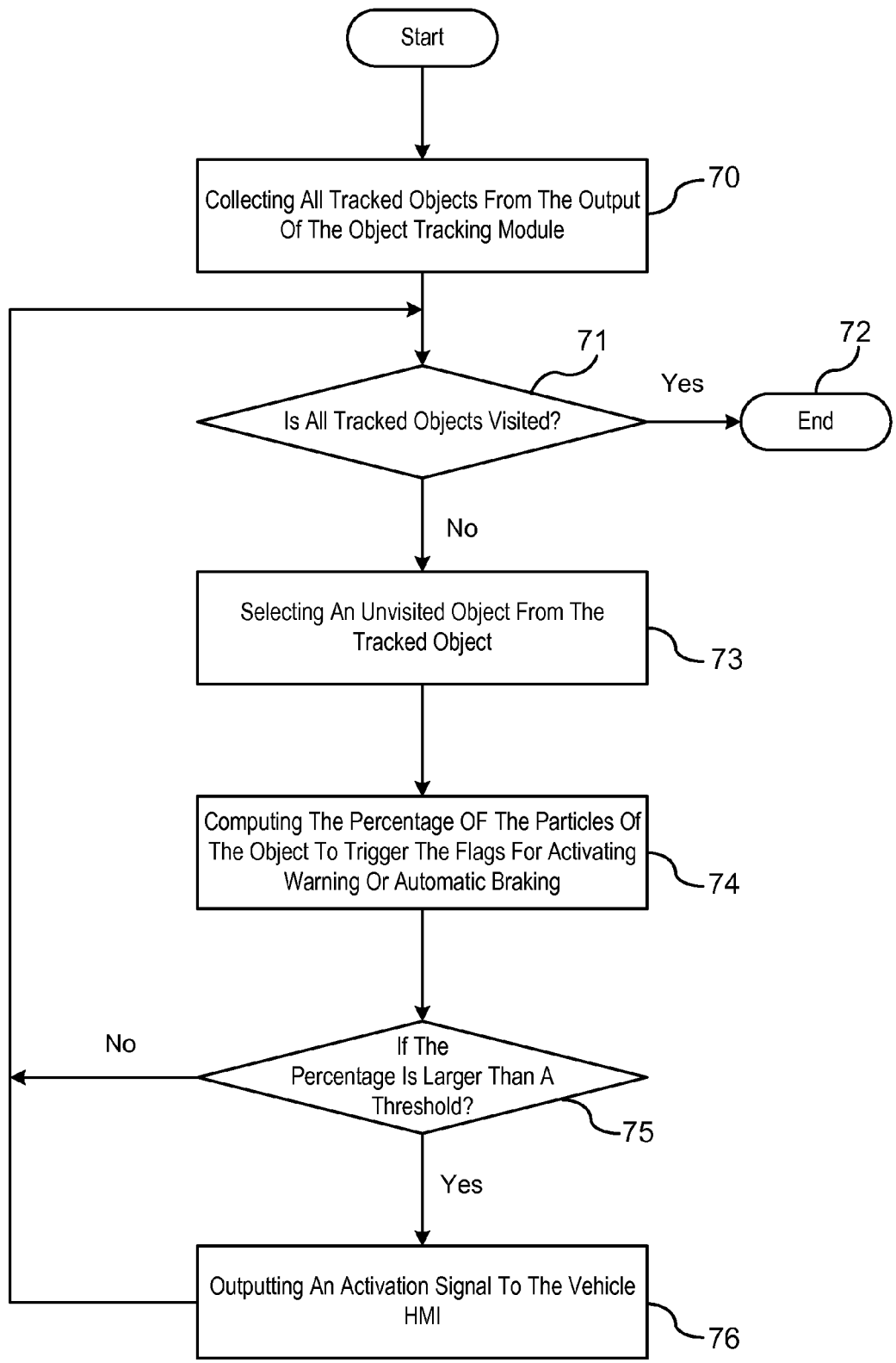
FIG. 12 is a flow chart for a threat assessment process.

FIG. 12 illustrates a flowchart of the threat assessment procedure. In step 70, all the tracked objects from the output of the object tracking module is collected.

In step 71, a determination is made whether all of the tracked objects have been visited. If a determination is made that all the tracked objects have been visited, the routine terminates in step 72. If the determination is made that not all the tracked objects have been visited, then the routine proceeds to step 73 to select an unvisited object from the tracked object.

In step 74, a percentage of the particles of the object are determined for triggering the flags which activate a warning or automatic braking.

In step 75, a determination is made if the percentage is greater than a threshold. If the percentage is not greater than the threshold, then the routine returns to step 71. If the percentage is greater than the threshold, then the routine proceeds to step 76.

In step 76, an activation signal is output to a vehicle human to machine interface in response to the percentage being greater than the threshold. The routine then returns to step 71.

While certain embodiments of the present invention have been described in detail, those familiar with the art to which this invention relates will recognize various alternative designs and embodiments for practicing the invention as defined by the following claims.

What is claimed is:

1. A cross traffic collision alert system comprising:
   an image-based detection device for capturing motion data of objects in a region of a direction of travel of a driven vehicle;
   a motion analysis module for monitoring the captured motion data, the motion analysis module identifying potential moving objects in the captured motion data;
   a salient region detection module for identifying regions of interest within the captured motion data that indicates at least portions of potential moving objects, the salient region module detecting regions having varying characteristics within the captured motion data;
   a predictive object detection module that is responsive to the outputs of the motion analysis module and the salient region detection module for generating at least one object candidate based on the potential moving objects identified by the motion analysis module and the salient region detection module;
   non-imaging object detection sensors for detecting the at least one object candidate in a region sensed by the non-imaging object detection sensors;
   an object tracking module for tracking the at least one object candidate detected by the predictive object detection module and by the non-imaging object detection sensors, the object tracking module fusing the at least one object candidate transitioning between the region sensed by the non-imaging object detection sensors and the region captured by the image-based sensing device, the object tracking module tracking a position and velocity of the at least one object candidate in relation to the driven vehicle, wherein fusing the at least one object candidate transitioning between the regions includes merging object data representing the at least one object candidate in the motion data with potential objects in the region sensed by the non-imaging object detection sensors; and
   a threat assessment module for determining a threat assessment of a potential collision between a tracked object candidate and the driven vehicle, the threat assessment module determining whether a warning should be provided in response to the threat assessment.

2. The system of claim 1 further comprising in-vehicle sensors for sensing steering and movement of the driven vehicle, wherein the object tracking module predicts a driving path of the driven vehicle in response to sensed input signals from the in-vehicle sensors, the object tracking module providing feedback of the projected path of the driven vehicle to the predictive object detection module for comparison between a current time frame and a previous time frame of the potential moving object for assessing whether the at least one object candidate is potentially on a collision path with the driven vehicle.

3. The system of claim 1 wherein a plant model is used to determine the projected path of the driven vehicle.

4. The system of claim 1 wherein the object tracking module generates fused object data that includes position and velocity data.

5. The system of claim 1 wherein the predictive object detection module uses motion analysis and scene analysis for identifying salient regions of interest.

6. The system of claim 5 further comprising an image patch extraction module for extracting image patches that identifies potential objects.

7. The system of claim 6 further comprising a feature extraction module for determining a distribution of edges and corners of an image patch, wherein the determined distribution is mapped to a feature description vector.

8. The system of claim 7 further comprising an object detector module for classifying whether the feature descriptor vector represents an object.

9. The system of claim 1 wherein the object detection sensors include short range radar sensors.

10. The system of claim 1 wherein the object detection sensors include side blind zone warning sensors.

11. The system of claim 1 wherein the image capture device includes a video camera.

12. The system of claim 1 wherein the object tracking module uses a particle filter to fuse candidate objects.

13. The system of claim 1 wherein the region sensed by the non-imaging detection sensors and the region captured by the image based detection device are non-overlapping regions.

14. The system of claim 1 wherein the region sensed by the non-imaging detection sensors and the region captured by the image based detection device include an overlapping region, the object tracking module tracking the at least one candidate object by jointly using the non-imaging detection sensors and the image based detection device while the at least one candidate object is in the overlapping region.

15. A method for detecting a potential collision between a driven vehicle and an object crossing a path of the driven vehicle, the method comprising the steps of:
   detecting a potential moving object using non-imaging object detection sensors in a region sensed by the non-imaging object detection sensors;

capturing motion data of objects in a region of a direction of travel of the driven vehicle by an image-based detection device;

identifying a potential moving objects from the captured motion data in the region captured by the image-based detection device;

identifying regions of interest within the captured image data that include potential moving objects;

applying a predictive object detection analysis that is responsive to the identified potential moving object and the identified regions of interest within the captured motion data for tracking the identified potential moving object potentially on a collision path with the driven vehicle;

fusing the potential moving objects transitioning between a region sensed by the non-imaging object detection sensors and the region captured by the image-based sensing device, the fusing of the potential moving objects transitioning between the regions of interest includes merging object data representing the potential moving objects in the motion data with potential moving objects in the region sensed by the non-imaging object detection sensors, wherein a position and velocity of the potential moving objects is tracked in relation to the driven vehicle;

determining a threat assessment of a potential collision between a tracked object and the driven vehicle; and issuing a warning of a potential collision between an object and the driven vehicle in response to the threat assessment.

16. The method of claim 15 wherein a previous jointly tracked data for the objects is applied to the prediction object detection analysis.

17. The method of claim 15 wherein applying predictive object detection analysis uses motion analysis and scene analysis for identifying salient regions of interest.

18. The method of claim 17 wherein applying predictive object detection analysis includes extracting image patches for identifying potential objects.

19. The method of claim 18 wherein applying predictive object detection analysis includes determining a distribution of edges and corners in the image patch.

20. The method of claim 19 wherein the determined distribution is mapped to a feature description vector.

21. The method of claim 20 wherein applying predictive object detection analysis includes classifying whether the feature descriptor represents an object.

22. The method of claim 15 wherein the region sensed by the non-imaging detection sensors and the region captured by the image-based detection device are non-overlapping, wherein the object tracking module fuses the potential moving objects as it transitions between the non-overlapping regions.

23. The method of claim 15 wherein the region sensed by the non-imaging detection sensors and the region captured by the image based detection device are an overlapping region, wherein the object tracking module tracks the potential moving objects by jointly using the non-imaging detection sensors and the image based detection device while the potential moving objects is in the overlapping region.

* * * * *